United States Patent [19]
Delaunay et al.

[11] Patent Number: 5,165,899
[45] Date of Patent: Nov. 24, 1992

[54] ELEMENT FOR FILTERING AND/OR PURIFYING HOT GASES, AND A PROCESS FOR MANUFACTURING SAME

[75] Inventors: Christophe Delaunay, Paris; Didier Loco, Fontenay aux Roses; André Walder, L'Hay les Roses, all of France

[73] Assignee: Office National D'Etudes et de Recherches Aerospatiales, France

[21] Appl. No.: 574,767

[22] Filed: Aug. 30, 1990

[30] Foreign Application Priority Data

Aug. 30, 1989 [FR] France ................................. 89 11390

[51] Int. Cl.$^5$ ..................... B01J 23/00; C22C 38/00; C22C 38/18
[52] U.S. Cl. ................................ 422/180; 422/177; 422/179; 420/34; 420/40; 420/62; 420/79; 148/325; 428/606; 502/439; 502/527
[58] Field of Search ................ 422/180, 177, 179; 420/34, 40, 62, 79; 148/325; 428/606; 502/439, 527

[56] References Cited

U.S. PATENT DOCUMENTS

| | | | |
|---|---|---|---|
| 4,094,673 | 6/1978 | Erickson et al. | 420/62 X |
| 4,139,376 | 2/1979 | Erickson et al. | 420/62 X |
| 4,244,736 | 1/1981 | Day | 420/40 X |
| 4,282,186 | 8/1981 | Nonnenmann et al. | 422/180 |
| 4,331,631 | 5/1982 | Chapman et al. | 422/180 |
| 4,360,957 | 10/1982 | Eng | 422/180 X |
| 4,414,023 | 11/1983 | Aggen et al. | 420/40 |
| 4,592,899 | 6/1986 | Caggiano | 422/180 |
| 4,600,562 | 7/1986 | Virk et al. | 422/180 |
| 4,870,046 | 9/1989 | Yamanaka et al. | 420/79 X |
| 4,900,517 | 2/1990 | Domesle | 423/215.5 X |
| 4,904,540 | 2/1990 | Ishii et al. | 420/40 X |

Primary Examiner—Robert J. Warden
Assistant Examiner—Stephanie Blythe
Attorney, Agent, or Firm—Larson and Taylor

[57] ABSTRACT

An element is disclosed for filtering and/or purifying hot gases, comprising a fibrous structure with a predetermined degree of porosity and formed of metal alloy fibrils of the MCrAlX type, in which M is a matrix chosen from iron and/or nickel and/or cobalt, and X is an element reinforcing the adhesion of the oxide layer which is formed on the fibrils in contact with the hot gases, chosen from zirconium, yttrium, cerium, lanthanum and misch metal.

13 Claims, No Drawings

ELEMENT FOR FILTERING AND/OR PURIFYING HOT GASES, AND A PROCESS FOR MANUFACTURING SAME

The present invention relates to improvements to the structure and the process for manufacturing filtering elements and/or catalysis purifying elements for purifying hot gases, for example (but not exclusively) the exhaust gases of internal combustion engines.

The active material supports used today in catalysis filtering and/or purifying elements for purifying hot gases and in particular in exhaust silencers for treating the exhaust gases of motor vehicles are essentially formed from ceramic (cordierite). The supports thus formed have the defects inherent in these materials, namely great mechanical fragility (sensitivity to vibrations and thermal shocks) which form a handicap in particular for the automobile application, high calorific capacity and mediocre heat conductivity (which increase the time required for obtaining optimum operating conditions), and a difficult manufacturing process (which considerably increases the cost).

Solutions have also been put forward using metal structures, particularly strips obtained by rolling. Generally, the cost is greater than that of ceramics, whose raw material is very cheap.

In all cases, known structures comprise rectilinear channels through which the gas to be purified flows: the flow is laminar and is not favourable for providing homogeneous contacting of the whole of the gaseous mass with the catalyst lining the walls of the channels. Solutions to this problem, it is true, allow a relative turbulence to be created increasing the efficiency of treatment of the gases, but the overall efficiency of the treatment is far from being completely satisfactory, and the structure of the silencer is complicated thereby.

Furthermore, known metal catalytic silencers are, it is true, adapted for treating the gaseous phase of the exhaust gases, particularly in the case of explosion engines, but are without appreciable effect for filtering out the solid particles in suspension in the gases, in particular for retaining the unburnt particles present in diesel engine exhaust gases.

An object of the invention is therefore to overcome these different drawbacks of presently known structures, by providing an improved structure, as well as its method of manufacture, which is more efficient in purifying the gases, which filters out the solid particles present therein, the same structure being able to fulfil a single one or both functions, which is simpler and less costly to manufacture and whose cost as a whole is lower than that of present structures.

For this, in a first aspect of the invention, an element is provided for filtering and/or purifying hot gases, which is characterized in that it comprises a fibrous structure having a predetermined degree of porosity and formed of metal alloy fibrils of MCrAlX type, in which M is a matrix chosen from iron and/or nickel and/or cobalt, and X is an element reinforcing the adhesion of the oxide layer which is formed on the fibrils in contact with the hot gases, chosen from zirconium, hafnium, yttrium, cerium, lanthanum and misch metal. By "misch metal" is meant a combined metal of ceric earths (lanthanum, cerium, praseodymium, neodymium, proethium, samarium) containing all the elements of the rare earths present in monazite (ceric earth orthophosphate containing yttric earths (europium, gadolinium, terbium, dysprosium, holmium, erbium, thulium, ytterbium, lutetium) in low proportions, as well as thorium and silica), or more particularly:

52% Ce, 18% Nd, 5% Pr, 1% Sm, 24% (La and other rare earths), or else, in a lanthanum enriched formula:

47% Ce, 19% Nd, 6% Pr, 1% Sm, 27% (La and other rare earths).

A fibrous structure of the claimed type withstands high temperatures and in particular the temperatures of about 150° C. to 900° C. met with in the exhaust gases of internal combustion engines; furthermore, the component materials are little oxidized and/or corroded at the temperatures considered, by the treated gases, in particular the corrosive exhaust gases of engines. Thus, a suitable lifespan of the fibrous filtering mass is ensured.

The quite particular efficiency of the fibrous structure used as filter results from the fact that the porosity may be adapted with precision to the filtering requirements, and especially to the fact that this fibrous structure, whatever its construction, does not have privileged paths for the gases; the small flow section offered to the gases between the adjacent fibrils and the incoherent, although homogeneous, distribution of the fibrils break up the paths followed by the gases, increase the turbulence and generally improve the contact between the gaseous mass and the fibrils.

The fibrils may be left in a random tangle and be compacted so as to obtain an homogeneous fibrous mass having said predetermined degree of porosity; but recourse may also be had to an organized structure and, for example, the fibrils may be woven and the appropriate woven layers may be stacked so as to obtain said predetermined degree of porosity.

Desirably, the fibrous structure is sintered so as to ensure mechanical interlocking between the fibrils which ensures better mechanical strength and maintains the homogeneity of the fibrous mass in time.

Advantageously, the fibrous mass is enclosed in a container so as to obtain an element which can be easily handled and which is protected against attacks by the surrounding pollution (mud, dust), especially when it is a question of forming exhaust silencers. The filter is then in the form of a cartridge which is easy to position.

Preferably, in this case, the container is made from metal and, because of sintering, the fibrils are not only interlocked with each other but, in addition, the peripheral fibrils are attached to the wall of the container, which prevents the fibrils from moving then in the container and contributes to conserving the initial homogeneity of the obtain structure in time.

With the arrangements which have just been discussed, a filtering element is obtained which is particularly well adapted for efficiently retaining the particles in suspension in the gases, particularly unburnt, oil, etc., particles in suspension in the exhaust gases of engines and in particular of diesel engines.

Furthermore, in a second aspect of the invention, a catalysis purifying element is provided for the catalytic purifying of hot gases which, besides the fact that it comprises all or parts of the above arrangements of the filtering elements, is characterized in that the fibrils are coated with a layer of a catalytic compound.

Preferably, the fibrils are coated with an intermediate layer of a wash coat and the catalytic compound is deposited on this intermediate layer. The presence of the wash coat considerably increases the effective contact area between the catalyst and the gases and the efficiency of the purifying element is therefore improved, for the same size.

Thus, with the invention, a catalysis purifying element is obtained which is of simple construction, of remarkable efficiency because of the turbulence of the gases caused by the absence of privileged paths and the large contact area means that substantially the whole of the gaseous mass which passes through it is contacted with the catalyst and undergoes purifying treatment. Furthermore, because the active part of the purifying element is formed by a fibrous mass identical to that which forms the above filtering element, the result is that, in a catalysis purifying element in accordance with the invention, the filtering and purifying functions are provided in a combined way by the same member, whence a gain in volume, weight and cost.

Finally, in a third aspect of the invention, a process is provided for manufacturing one or other of the above filtering or purifying elements.

The process according to the invention for manufacturing an element for filtering and/or purifying hot gases is characterized in that it comprises the following steps:

metal alloy fibrils of the MCrAlX type are prepared in which M is a matrix chosen from iron and/or nickel and/or cobalt and X is an element reinforcing the adhesion of the oxide layer which is formed on the fibrils in contact with the hot gases, chosen from zirconium, hafnium, yttrium, cerium, lanthanum and misch metal, and these fibrils are assembled so as to form a fibrous structure having a predetermined degree of porosity.

In a particularly advantageous way, because of its efficiency, the fibrils are obtained by a roller overhardening process, known per se. In this connection reference may be made to the patent application FR 2 587 635.

It is possible to leave the fibrils in a random distribution and compact them so as to obtain a felt having the desired degree of porosity; in this case, it may be desirable to crush the fibrils before compacting them so as to give them a sufficiently small length so that they are suitably and homogeneously tangled.

But it is also possible to use fibrils in an organized form, for example by forming a meshed fabric and stacking several fabric thicknesses so as to obtain the desired degree of porosity.

Preferably, the fibrous structure is subjected to a sintering treatment so that the fibrils are interlocked with each other.

Advantageously, the fibrous structure is introduced into a metal container and the assembly is subjected to the sintering treatment so that the fibrous mass is attached, by its peripheral fibrils, to the wall of the container.

To obtain a purifying element with catalytic operation for purifying hot gases by catalysis, the process may be continued by then coating the fibrils with a layer of a catalytic compound, preferably after the fibrils have undergone a surface treatment for increasing their binding power. Preferably also, before depositing the catalytic compound, the fibrils are coated with an intermediate layer of a wash coat.

The invention will be better understood from the following detailed description.

The invention uses the high resistance to oxidation at high temperatures of alloyed metal materials of MCrAlX type, in which M is a matrix chosen from iron and/or nickel and/or cobalt and X is an element reinforcing the adhesion of the oxide layer which is formed on the fibrils in contact with the hot gases and chosen from zirconium, hafnium, yttrium, cerium, lanthanum and misch metal, as mentioned above.

Abradable metal materials MCrAlY are known, used for example for protecting turbine blades (F. DUFLOS et al, New materials for honey comb structures with improved resistance to high temperature oxidation, high temperature alloys for gas turbine and other applications, 1986, Proceedings of the Conference, Liege, Belgium, Oct. 6–9, 1986, D. Reidel publishing company) for obtaining which a good performing manufacturing method has been proposed (patent application FR 2 587 635).

In brief, this method consists in projecting a jet of liquid metal alloy on the periphery of a rotating metal wheel. The liquid metal solidifies rapidly in contact with the wheel and gives rise to the formation either of a ribbon or of fibrils, depending on the configuration of the solidification surface. The transverse dimensions (width and thickness) are adjusted mainly by the ejection slit width, the distance between wheel and crucible and the speed of rotation of the wheel. The advantages of this method is twofold. It makes is possible to obtain strips or fibrils in alloy compositions which could not be transformed because of their lack of ductility. For example, in the case of MCrAlY alloys, it has made it possible to increase the aluminium content, and so their resistance to oxidation. This could not be achieved using conventional metallurgical processes for these alloys which can be neither rolled nor drawn. There exist nevertheless limits which are imposed by the phase diagrams, the presence of a fragile compound possibly reducing the ductility of the material or making use thereof difficult.

It has also simplified the manufacturing cycle which, after manufacture of the alloy ingot, comprises only an operation of casting on a wheel while leading to a material in which the added elements are distributed very homogeneously.

The fibrils produced by this process are in the form of very fine slivers, of a semi circular cross section whose two transverse dimensions (width and thickness) are adjustable by adjusting the geometry of the wheel and the conditions of ejection of the liquid metal. Their length, which is between a few centimetres and about one metre, may possibly be reduced by passing through a blade crusher.

Other techniques are known for obtaining individual fibres or coarse fibrils of a metal alloy of this type (particularly by cold clawing or drawing) which make it possible to manufacture felts, steel wools or steel shavings. However, in all cases, the alloy grades used must have properties adapted to the processes used ; in particular these alloys must be sufficiently ductile. This condition then restricts the nature of the fibres to materials moderately charged with hardening elements. In the case of MCrAlX alloys, the aluminium content, which conditions the resistance to oxidation, must be limited to a sufficiently low level so as to avoid excessive hardening, making the transformation difficult, even impossible. Even though, for some materials, particularly elaborate transformation conditions make it possible to obtain relatively fine threads, the production cost remains very high.

The process recommends roller over-hardening so as to get round this difficulty, since no thermomechanical transformation is required for obtaining the fibril.

The individual fibres, or fibrils, possibly crushed (so as to increase more easily the apparent density of the felts) in order to obtain lengths of the order of a few millimetres, for example 10 to 15 mm, may be assembled together in a randomly disordered, but homogeneous, distribution so as to form a felt whose porosity may be adjusted by simple compression (porosity possibly exceeding 95%).

It is also possible to use relatively long fibres for forming an ordered structure, for example so as to form a fabric. The meshwork of the fabric, with possible compacting, here again makes it possible to obtain a desired degree of porosity.

Mechanical consolidation of the porous fibrous structure thus obtained is achieved by halogenated phase sintering. This technique is made necessary by the presence of aluminium which, during heat treatment, even in a high vacuum, leads to the formation on the surface of the fibres of a thin alumina layer hindering their bonding by diffusion. On the other hand, the halogen formed from a donor cleans the surface of the fibres and allows sintering. During this treatment, the chemical activity of the elements in the gaseous phase is adjusted by a cement adapted to the composition of the fibres so as to avoid any modification of the composition due to an exchange between the felt and the treatment enclosure (see particularly : P. GALMICHE, Application en constructions aérospatiales et retombées des techniques thermochimiques ONERA, L'aéronautique et l'Astronautique, no. 41 —1973 —3, page 33 to 42 ; R. PICHOIR, Etude comparative de deux méthodes de projection pour superalliages cas de revétements de type NiAl sur alliage IN 100, La Recherche Aérospatiale, no. 1974-5, p. 277 to 289.

The fibrous mass may be disposed in a powdery cement formed, on the one hand, of the same metal elements as the fibrils, or of a part of these elements, at closely related concentrations, and, on the other hand, a chemically inert ceramic diluent (generally alumina) for avoiding setting of the cement during the sintering operation. The treatment, which lasts several hours, is carried out at a high temperature in a protective hydrogen or argon atmosphere.

To avoid immersion in the powdery cement, a time consuming operation making the procedure discontinuous, a treatment may be carried out in a gaseous atmosphere. The fibrous mass is then placed in an enclosure where a gas atmosphere prevails containing a halide coming from an appropriate cement. The treatment may thus be continuous, which reduces the handling operations and the cost of this production step.

It is desirable for the fibrous mass to be disposed in a container, such as a tube, so as to form a protected and more easily handled component. This container is open so as to allow the hot gases to pass. Preferably, the fibrous mass is placed in a metal tube before the sintering operation, and the treatment is carried out on the assembly formed by the tube and the fibrous mass which it contains. There is then mechanical bonding by sintering between the peripheral fibres and the wall of the tube. The felt is then attached to the tube, and the assembly forms a sort of cartridge which may be introduced in any filtering and/or purifying system and which is related to a catalytic silencer structure. It goes without saying that the form of the tube (circular, square section, . . . ), its composition in the case of a metal tube (in the limit of the compatibility of the material with the process) and its structure (sealed, apertured, formed of a metal sheet or a sieve, . . . ) are parameters which are quite compatible with the sintering technique used. This process makes it possible to develop various geometries, such for example as a structure permitting axial introduction of the gases with radial flow towards a manifold.

The filter thus obtained is capable of retaining particles in suspension in gases, for example for filtering the exhaust gases of internal combustion engines and, in particular, of diesel engines.

By way of purely illustrative example, two fibril compositions have been formed by over-hardening a composition of the Fe Ni Cr Al Y type and a composition of the Fe Cr Al Y type (percentage by weight 36.5 Fe —37 Ni —20 Cr —6 Al —0.5 Y.). As hardened, the length of the fibrils is about one metre.

For the first composition (Fe Ni Cr Al Y) (weight percentage 36.5 Fe —37 Ni —20 Cr —6 Al —0.5 Y.), a cylindrical cartridge of 50 mm in diameter and 100 mm in length was formed by pressing to the porosity of 95% of fibrils distributed isotropically in a stainless steel tube.

The fibrils of the second composition (Fe Cr Al Y) were reduced to a few centimetres in length (2 cm) by means of shears then crushed in a blade crusher so as to give them an irregular shape favourable to high porosities. These Fe Cr Al Y fibrils were pressed to the porosity of 90% in a dense alumina tube of the same dimensions as said stainless steel tube.

The sintering was carried out under hydrogen in a halogenated atmosphere in cement at 1050° C. for 16 hours. The nickel or steel box containing the cement and the parts to be sintered is previously exhausted, then filled with argon, the operation being repeated three times so as to eliminate a portion of the oxygen retained. The cement is formed of alumina (50%), chromium (42.5%) and aluminium (7.5%) powder in which 1% of activator is incorporated (here ammonium chloride). When hot, the activator is decomposed and forms a chromium halide and aluminium halide atmosphere. Depending on the activity (i.e. the partial balance pressure) of these halides at the surface of the parts, a chromium or aluminium deposit is formed or not on these surfaces. It may be advantageous not to have any transfer : in this case, the atmosphere is protective and the sintering takes place without co-deposit. For the cement and the alloys used, the sintering was accompanied by a slight aluminium deposit.

Cooling takes place in a hydrogen atmosphere. The parts are then carefully cleaned so as to remove any trace of cement.

In the first case, the stainless steel tube adheres to the fibrils which it contains, by diffusion the cartridge can be used directly.

In the second case, the alumina tube does not adhere to the fibrils. The sintered fibril cylinder is ready to be included in an assembly.

The filtering efficiency of these cartridges on soot particles from diesel engines proved to be very high. Cyclic oxidation tests (cycle of 1 hour) showed that the Fe Ni Cr Al Y felts withstand more than 1000 cycles at 1050° C.

On the basis of the fibrous structure obtained, following the sintering operation, it is possible to obtain a catalysis purifying filter by depositing a catalytic compound on the fibrils.

Although the catalytic compound may be deposited directly on the surface of the fibrils, after a possible surface treatment for increasing the binding power of the compound, it is however preferable to deposit an intermediate layer (wash coat) formed of alumina which is consolidated by heat treatment. This intermediate layer with porous surface considerably increases the effective contact area with the surrounding atmosphere, which area may reach 30 to 40 m²/g, instead of about 1 m²/g for the combined surface of the fibres. The catalytic compound is then supplied from a solution of metal salts forming the compound and which are distributed on the surface of the intermediate layer and, after decomposition heat treatment, form crystallites of a few nanometres.

Following which, a filter is obtained which is not only capable of providing a function of filtering out the particles contained in the gases, as mentioned above but, in addition, is capable of fulfilling the function of catalytic purification of the gases in a particularly efficient way because of the turbulences introduced by the fibrous structure in the gas flow and because of the considerable contact area between the gases and the catalyst.

A filter in accordance with the invention is then particularly well adapted to be used as a catalytic silencer for the treatment of the exhaust gases of internal combustion engines, of whatever type.

As is evident and as it follows moreover from what has gone before, the invention is in no wise limited to those of its modes of application and embodiments which have been more particularly considered; it embraces, on the contrary, all variants thereof.

We claim:

1. An element for filtering or purifying gases comprising a fibrous structure disposed in a metal container, said container being open so as to allow for the passage of gases therethrough and having an internal surface and an external surface, said fibrous structure having a predetermined degree of porosity and formed of metal alloy fibrils, including peripheral metal alloy fibrils, of MCrAlX; wherein M is a matrix including at least one element selected from the group consisting of iron, nickel or cobalt and X is an element selected from the group consisting of zirconium, hafniun, yttrium, cerium, lanthanum and misch metal, said metal alloy fibrils being sintered together so as to bond fibrils together and said peripheral metal alloy fibrils being sintered to the internal surface of said metal container.

2. Element according to claim 1, wherein the fibrils are compacted so as to obtain said predetermined degree of porosity.

3. Element according to claim 1, wherein the fibrils are arranged in a woven layered structure, and the woven layers are stacked so as to obtain said predetermined degree of porosity.

4. Element according to claim 1 wherein the fibrils are coated with a layer of a catalytic compound.

5. Element according to claim 4, wherein the fibrils are coated with a washcoat and wherein the catalytic compound is deposited on the washcoat.

6. Method of manufacturing an element for filtering or purifying gases comprising preparing metal alloy fibrils or MCrAlX; wherein M is a matrix including at least one element selected from the group consisting of iron, nickel or cobalt and X is an element selected from the group consisting of zirconium, hafnium, yttrium, cerium, lanthanum and misch metal, assembling said fibrils to form a fibrous structure, including peripheral metal alloy fibrils, having a predetermined degree of porosity, placing said fibrous structure in a metal container, said container being open so as to allow for the passage of gases therethrough, said metal container having an internal surface and an external surface, sintering said metal alloy fibrils together so as to bond fibrils together and said peripheral metal alloy fibrils being sintered to the internal surface of said metal container.

7. Method according to claim 6, wherein the preparing step comprises obtaining the fibrils by using a roller over-hardening process.

8. Method according to claim 6, wherein the assembling step comprises leaving the fibrils in a randomly disordered distribution and compacting the fibrils so as to obtain the predetermined degree of porosity.

9. Method according to claim 8, wherein before the compacting step, the individual fibrils are crushed.

10. Method according to claim 6, wherein the assembling step comprises weaving the fibrils into a mesh so as to obtain the predetermined degree of porosity.

11. Method according to claim 6, wherein the preparing step comprises coating the fibrils with a layer of a catalytic compound.

12. Method according to claim 11, wherein before the coating step, the surfaces of the fibrils are treated so as to increase their binding power between the catalytic compound and the fibrils.

13. Method according to claim 12, wherein the treatment step comprises coating fibrils with an intermediate layer of a washcoat.

* * * * *